US007698083B2

(12) United States Patent
Fröhlich et al.

(10) Patent No.: US 7,698,083 B2
(45) Date of Patent: Apr. 13, 2010

(54) CONTROL APPARATUS AND METHOD THAT COMPENSATES FOR DISTURBANCE SIGNALS OF A SENSOR

(75) Inventors: Thomas Fröhlich, Zurich (CH); Gerhard Oberhoffner, Graz (AT)

(73) Assignee: Austriamicrosystems AG, Unterpremstatten (AT)

( * ) Notice: Subject to any disclaimer, the term of this patent is extended or adjusted under 35 U.S.C. 154(b) by 0 days.

(21) Appl. No.: 11/573,230

(22) PCT Filed: Aug. 5, 2005

(86) PCT No.: PCT/EP2005/008543
§ 371 (c)(1),
(2), (4) Date: Jun. 28, 2007

(87) PCT Pub. No.: WO2006/015823
PCT Pub. Date: Feb. 16, 2006

(65) Prior Publication Data
US 2007/0282552 A1     Dec. 6, 2007

(30) Foreign Application Priority Data
Aug. 6, 2004   (DE) .................. 10 2004 038 370

(51) Int. Cl.
*G01D 18/00*   (2006.01)
*G06F 17/40*   (2006.01)
(52) U.S. Cl. .................. 702/95; 702/85; 702/104; 700/26
(58) Field of Classification Search ............ 702/95, 702/85, 104
See application file for complete search history.

(56) References Cited

U.S. PATENT DOCUMENTS 4,509,110 A     4/1985   Levesque et al.

(Continued)

FOREIGN PATENT DOCUMENTS

DE          35 21 594          9/1989

(Continued)

OTHER PUBLICATIONS

Search Report for PCT/EP2005/008543.

(Continued)

*Primary Examiner*—Hal D Wachsman
(74) *Attorney, Agent, or Firm*—Fish & Richardson P.C.

(57) ABSTRACT

A control apparatus configured to generate correction values for compensation of disturbance signals of a sensor includes a control loop having an input to receive input values. The control loop includes circuitry configured to receive the input values and configured to produce output values based on the input values, and an evaluation device downstream from the circuitry relative to the input, which is configured to receive the output values and to convert the output values into result values. The apparatus also includes a correction device configured to receive the result values and the input values, to generate correction values based on the result values and the input values, and to provide the result values to the circuitry. The correction device includes a detection device having memory, which stores the input values in the memory based on the result values.

20 Claims, 2 Drawing Sheets

U.S. PATENT DOCUMENTS

| | | | |
|---|---|---|---|
| 5,157,596 A | | 10/1992 | Alcone |
| 5,402,400 A | * | 3/1995 | Hamada et al. .......... 360/78.06 |
| 5,983,152 A | * | 11/1999 | Genzel et al. ................. 701/51 |
| 6,386,351 B1 | * | 5/2002 | Salecker et al. ............ 192/54.1 |
| 6,445,176 B1 | | 9/2002 | Wallrefen |
| 2001/0017834 A1 | * | 8/2001 | Kravtchenko et al. .... 369/59.17 |
| 2003/0178989 A1 | | 9/2003 | Vig et al. |
| 2003/0225539 A1 | | 12/2003 | Motz et al. |

FOREIGN PATENT DOCUMENTS

| | | |
|---|---|---|
| DE | 33 19 983 | 6/1993 |
| DE | 38 52 289 | 7/1995 |
| DE | 694 09 250 | 11/1998 |
| DE | 198 44 663 | 4/2000 |
| DE | 199 36 763 | 2/2001 |
| DE | 100 60 125 | 6/2002 |
| DE | 102 23 767 | 12/2003 |
| DE | 103 01 869 | 7/2004 |
| EP | 0 469 617 | 2/1992 |
| EP | 0 324 029 | 11/1994 |
| EP | 0 722 579 | 3/1998 |
| EP | 1 439 440 | 7/2004 |

OTHER PUBLICATIONS

Written Opinion for PCT/EP2005/008543.
Second German Examination Report in corresponding application 102004038370.7.
Translation of IPER for PCT/EP2005/008543.
German Examination Report in corresponding application 102004038370.7.
Kofahl, R., "Robuste Parameteradaptive Regelungen", Springer-Verlag (1988).
English Translation of Office Action in German Application No. 10 2004 038 370.7, dated Apr. 21, 2005.

* cited by examiner

CONTROL APPARATUS AND METHOD THAT COMPENSATES FOR DISTURBANCE SIGNALS OF A SENSOR

CROSS-REFERENCE TO RELATED APPLICATIONS

This application is a U.S. national stage application of international application no. PCT/EP2005/008543, which claims priority to German application no. 102004038370.7.

TECHNICAL FIELD

This patent application relates to an adaptive control apparatus for the self-compensation of disturbance signals of a sensor comprising a comparison device arranged in a control loop, input values of the control loop and also correction values of a correction device being fed to the comparison device.

This patent application also relates to an adaptive method for the self-compensation of disturbance signals of a sensor, in which input values are compared with correction values. This patent application also relates to a sensor comprising a control apparatus and to a use of a control apparatus of this type for the self-compensation of disturbance signals of a sensor.

BACKGROUND

A control apparatus and a method for the self-compensation of disturbance signals of a sensor are known from US 2003/0178989 A1, by way of example, wherein the sensor is a Hall sensor. The control apparatus disclosed therein has a comparison arrangement arranged in a control loop, and also an evaluation device connected downstream of the comparison arrangement, which evaluation device converts output values of the comparison arrangement into result values. The result values are fed to a correction device, which generates correction values, the correction values and also input values of the control loop being fed to the comparison arrangement and the input values being corrected by the correction values. The control apparatus can be operated independently of an operating mode of a sensor.

The disturbance signal is an offset that is assumed to be constant. Although the offset is largely eliminated by the control apparatus, a non-negligible inaccuracy remains in the ratio of disturbance signal to useful signal. A further disadvantage is that the control apparatus cannot be used, or can only be used to a limited extent, in the case of temporally variable disturbance signals.

Known methods for the compensation of disturbance signals, in particular offsets, comprise calibration cycles, adjustment of a signal and compensation of a drift of a disturbance signal by means of high-pass filtering. These techniques cannot be used for some applications, because e.g. it is not possible to carry out calibration cycles or because the input signal may be constant over long times, so that a high-pass filter may cause errors.

SUMMARY

Described herein is a control apparatus which enables a novel and, for many applications, more accurate self-compensation of disturbance signals of a sensor and also a self-compensation of temporally variable disturbance signals. Also described herein is a sensor comprising a control apparatus of this type, the use of a control apparatus of this type for the self-compensation of disturbance signals of a sensor and also of a method for the self-compensation of disturbance signals by means of which, in particular, a control apparatus of this type can be operated.

The control apparatus has an evaluation device connected downstream of a comparison device, which evaluation device converts output values of the comparison device into result values. As described herein, both the result values and the input values of the control loop are fed to a correction device.

Therefore, not only the result values but also in addition the input values are fed to the correction device. The input values are additionally also fed to the comparison device arranged in the control loop, in the same way as the correction values generated by the correction device.

The control apparatus is also used for the self-compensation of disturbance signals of a sensor and is, in particular, a component part of a sensor even though it may per se be constituted independently of a remaining constitution of the sensor or an operating mode of the sensor.

In a method for the self-compensation of disturbance signals of a sensor, input values are compared with correction values, the comparison results are converted to result values and correction values are generated from the input values and the result values. The method is suitable in particular for operation of the control apparatus.

The method is based on the principle that correction values for the input values are generated from input values that generally have disturbance signals, and also from result values that are generated from comparison results and may likewise also have a portion of the disturbance signals. The more often correction values are generated, the more accurately the latter or the result values, i.e. the portion of disturbance signals in the comparison results, converge essentially toward zero.

The method is therefore also suitable in principle for the self-compensation of temporally variable disturbance signals since both the input values and the result values influence the generation of the correction values. An alteration of the disturbance signal generally leads to an altered relationship between input values and result value. Moreover, with the method or through use of the apparatus it is possible, in principle, for a disturbance signal to be essentially completely compensated for.

The generation of correction values may comprise a comparison of a result value with reference values. If the result value corresponds to a reference value, input values are stored which are assigned to the result value. After input values have been stored for the reference values, correction values are generated from a comparison of an expected relationship with an actual relationship of stored input values with respect to one another.

By virtue of the fact that the input values are not directly converted to result values, rather they are firstly corrected by correction values, identical input values generally lead to different result values after each generation of new correction values. This in turn advantageously has an influence on the generation of the correction values.

In one advantageous embodiment of the method, in each case at least two input values are converted to a result value. To put it another way, the input value is an at least two-valued vector.

The result value in the case of the method may be compared with at least two pairs of reference values, which may advantageously lead to an increased accuracy and stability of the method.

In a further embodiment of the method, the result value is an angle. The method is advantageously suitable in particular for the error compensation of disturbance signals of a magnetic field sensor for angle measurement.

Expediently, the input values which are assigned to different result values, in the case of an expected relationship with respect to one another, correspond to points of a system of coordinates which lie on a centrosymmetrical curve. In this case, the points which correspond to stored input values which are converted to a result value corresponding to a reference value, in the case of an expected relationship may be arranged centrosymmetrically about the origin. Such input values with such an expected relationship with respect to one another are suitable for an application of the method.

In the generation of the correction values, a weighted sum is in each case formed from the stored input values which correspond to an identical coordinate or an identical vector component.

In a further advantageous embodiment of the method, generation of the correction values comprises a filtering of values using a filter. The filter may have the effect of a step function. The use of a filter makes it possible to prevent the correction value from diverging in the case of great fluctuations of the disturbance signal.

The result value may be converted from a first corrected input value x and a second corrected input value y and this conversion comprises a calculation of arctan (y/x).

The control apparatus may be configured in such a way that the correction device has a detection device, which stores input values in a manner dependent on the result values in a memory device.

For this purpose, the detection device advantageously has, alongside the memory device, a reference memory and a comparator. The comparator compares the result values with reference values stored in the reference memory.

The detection device particularly advantageously has a prestorage buffer, in which the input values are stored temporally. It is thus possible for the input values still to be retrievable even when firstly result values have been converted from them and the result values have been compared with the reference values.

The correction device expediently has a correction value generator, which generates correction values from the input values stored in the memory device.

In a configuration of the control apparatus, the correction value generator has an accumulator, which generates a weighted sum of stored input values.

Advantageously, the correction value generator additionally or alternatively has a filter, in particular a nonlinear filter.

Embodiments are explained in more detail below with reference to the figures.

DETAILED DESCRIPTION

Figure 1:
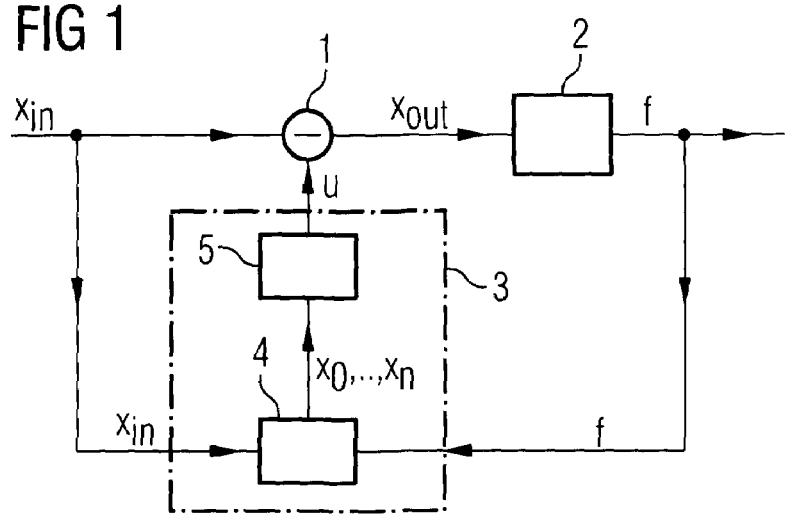
FIG. 1 shows a schematic construction of a control apparatus.

The schematic illustration of a control apparatus of FIG. 1 reveals a basic construction of the control apparatus and a basic sequence of the method. Input values $x_{in}$ are fed both to a correction device 3 and to a comparison arrangement 1.

The correction device 3 is likewise fed result values f converted from output values $x_{out}$ of the comparison device 1 by the evaluation device 2. In this case, the result values f are a function of the output values $x_{out}$. Correction values u are generated in the correction device 3, The correction values being fed to the comparison device 1, with the result that the input values $x_{in}$ are corrected on the basis of the correction values u. By way of example, the correction values are subtracted from the input values, that is to say that the comparison device 1 is e.g. a subtracting arrangement.

The input value $x_{in}$ is generally a one- or multi valued vector, e.g. it is a two-valued vector, i.e. $x_{in}$ for example ultimately represents two input values or the two vector components. This also applies e.g. to the output values $x_{out}$ in the comparison device 1. By contrast, the result value f is in this example a scalar that is generally calculated from a function of $x_{out}$ or is converted from $x_{out}$ on the basis of such a function in the evaluation device 2, but it may also be a vector.

The correction device 3 has a detection device 4 and also a correction value generator 5. In the detection device, input values or input value vectors $x_0, \ldots, x_n$ are stored in a manner dependent on the result values f and are fed to the correction value generator 5. The selection of the input values $x_{in}$ to be stored in a manner dependent on the result value f is already a decisive step in the generation of the correction value u and significantly influences the constitution of the correction value generator 5. In the stored input values $x_0, \ldots, x_n$, by virtue of their selection, the assigned result value f is in each case also implicitly taken into account and therefore fed to the correction device 3. The assignment of the stored input values to the corresponding result value f or the reference value $f_{ref}$ may alternatively also be stored explicitly as separate information.

Figure 2:
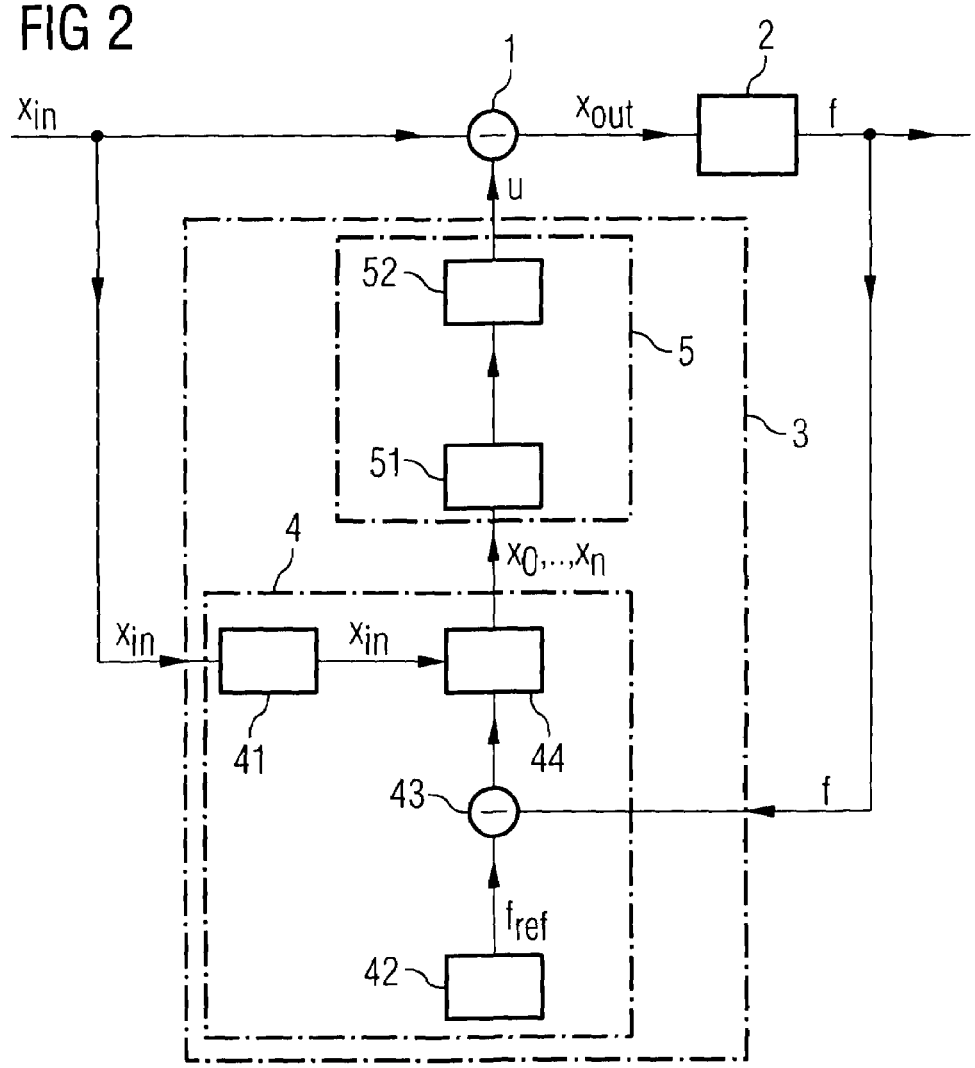
FIG. 2 shows a detailed schematic illustration of the control apparatus illustrated in FIG. 1.

The detection device 4 is constructed, for example, in the manner illustrated in FIG. 2. It has a reference memory 42, in which n reference values $f_{ref}$ are stored. The reference values $f_{ref}$ and the result values f are fed to a comparator 43, which compares the respective result value f with the reference values $f_{ref}$.

If the result value f matches one of the n reference values $f_{ref}$, then a corresponding signal is fed to a memory device 44 by the comparator 43. This signal has the effect that input values $x_{in}$ which are assigned to the result value f are stored in the memory device 44, that is to say that they are fed to the memory device 44 e.g. from a prestorage buffer 41, in which they are buffer-stored temporarily, and stored in the memory device 44 if a corresponding signal of the comparator 43 is present.

The input values $x_0, \ldots, x_n$ stored in the memory device 44 are fed to the correction value generator 5, which converts them to the correction value u. The stored input values $x_0, \ldots, x_n$ have an expected relationship with respect to one another, that is to say a relationship that would be expected in the absence of disturbance signals. In actual fact, however, they generally have a portion of disturbance signals, so that their actual ratio with respect to one another differs from the expected ratio. The correction value u is calculated in the correction value generator 5 on the basis of this difference.

A disturbance signal is superposed on a useful signal of a sensor that is actually to be generated and may arise e.g. as a result of manufacturing tolerances and a non-ideal construction of a sensor that is brought about as a result. A disturbance signal also includes, in particular, a superposed DC signal, e.g. an offset.

The correction value generator has an accumulator 51, for example, in which a weighted sum of the input value vectors $x_0, \ldots, x_n$ is calculated. Such an accumulator 51 may be used for example if it is expected that the stored input values $x_0, \ldots, x_n$ correspond to points in a system of coordinates which are arranged centrosymmetrically about a midpoint, for example about the origin. This is an example of an expected relationship of the stored input values with respect to one another. If the sum of the stored input value vectors $x_0, \ldots, x_n$ is formed, then the midpoint would have to be produced as the result if the expected relationship were actually present. The difference between the actually calculated point and the midpoint is a measure of a disturbance signal present and corresponds to an error vector in the case of an offset as disturbance signal.

The accumulator 51 forms an arbitrarily weighted sum, which may be divided for example by a factor 1 or a factor 1/n, where n is the number of stored input values.

In addition to the accumulator 51, the correction value generator 5 may have e.g. a filter 52, to which the output values of the accumulator 51 are fed. The filter 52 is a non-linear filter, for example, which limits, e.g., a maximum change in the correction value u when the correction value is recalculated. The filter 52 has a step-function-like effect, for example, through which the correction value u, in a manner dependent on the input values of the filter 52, is increased by a unit size, reduced by a unit size or not altered at all. As an alternative, the filter 52 could also have linear properties up to a specific maximum magnitude of an input value of the filter 52 and, in the case of larger magnitudes of the input value, limit a change in the correction value u to a maximum correction value difference. The stability of the control apparatus or the control loop is thereby increased.

The correction value u, which is generally a vector having a plurality of components, for example having two components, in the same way as the input value $x_{in}$, is fed to the comparison device 1 from the correction value generator 5 and is compared with the input value $x_{in}$.

Figure 3:
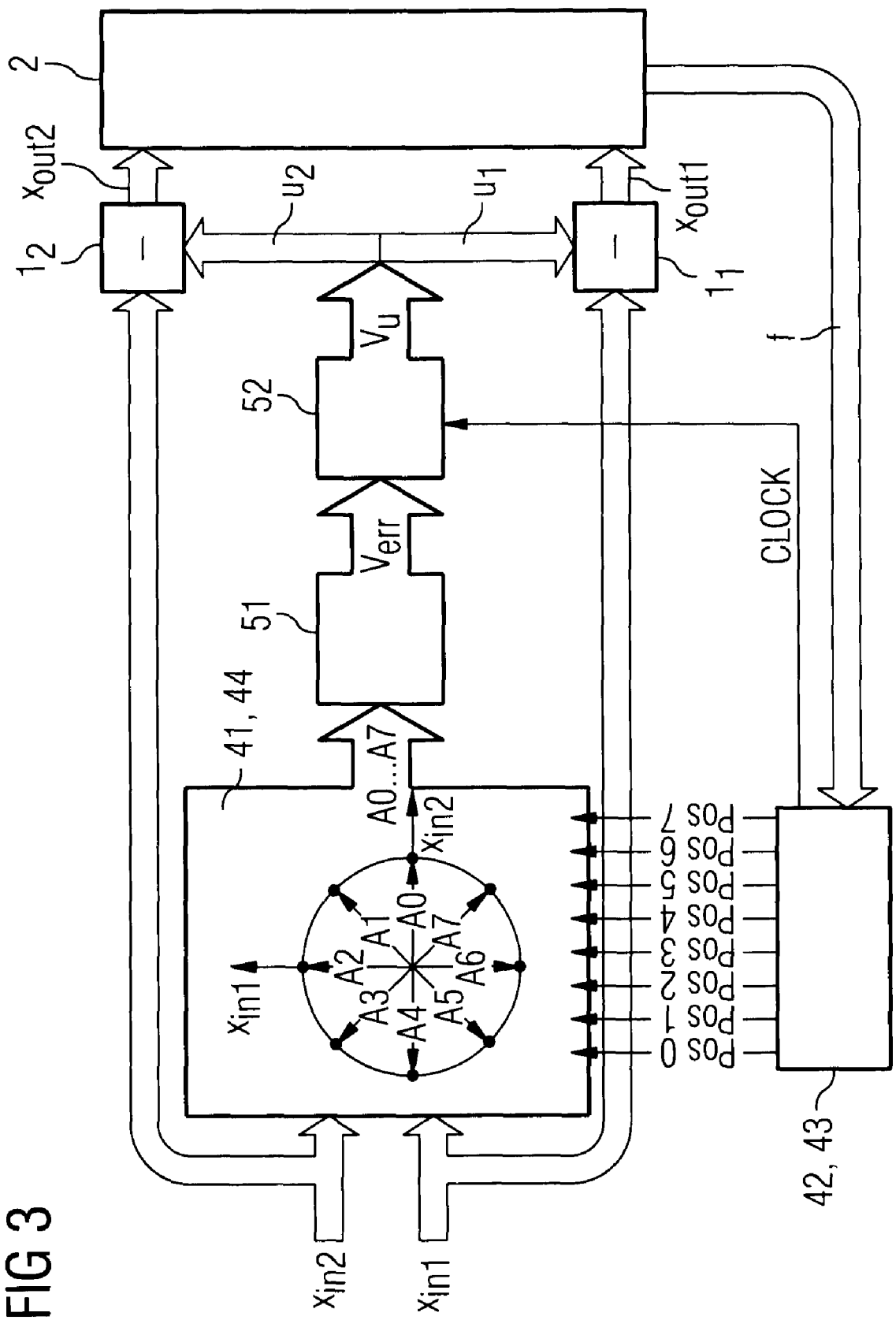
FIG. 3 shows a schematic illustration of a further exemplary embodiment of the control apparatus.

FIG. 3 illustrates both individual components of the input value $x_{in}$ and individual components of the correction value u. The input value $x_{in}$ has two components $x_{in1}$ and $x_{in2}$ and the correction value has the components $u_1$ and $u_2$. The first and the second component of the input value $x_{in}$ and of the correction value u are in each case compared with one another at a comparison device $1_1$ and $1_2$, respectively. The output values of the comparison device $1_1$ and $1_2$, respectively, are fed to an evaluation device 2, in which they are converted to a result value f.

The control apparatus illustrated in FIG. 3 is configured, e.g., for the self-compensation of disturbance signals of a magnetic field sensor, for example of a Hall sensor, and is used for such a sensor. For this purpose, the apparatus may either be integrated into the sensor itself, or be embodied as a separate unit.

A Hall sensor is used for example for the contactless measurement of angles. It has a Hall element, which outputs a voltage signal in the magnetic field as a Hall signal if a current flows through it perpendicularly to the magnetic field. The Hall signal, that is to say the Hall voltage, is dependent on the product of the vertical component of the magnetic flux density, the Hall current and the Hall constant. The Hall constant specifies the sensitivity of the Hall element and is material-dependent.

The Hall sensor has, e.g., two Hall elements, which are arranged for example in a plane and which are perpendicular to one another in the plane with respect to their current flow. As a result, the sensor generates two sensor signals which, in the absence of disturbance signals, are to one another like a sine (e.g. $x_{in1}$) and a cosine (e.g. $x_{in2}$) of an angle $\Phi$ to be determined. The angle $\Phi$ is determined from the output values $x_{out1}$ and $x_{out2}$ in the evaluation device 2, e.g. by the calculation of arc tangent ($x_{out1}/x_{out2}$). In this example, the result value f is equal to the angle $\Phi$.

The result value f is fed to a comparator 43, by which it is compared with reference values stored in a reference memory 42. The reference values are likewise angles, for example, e.g. 4 angle pairs being stored, of which the reference angles of an angle pair have a difference of 180° or π with respect to one another. If the result value f is equal to one of the reference values, then a corresponding signal Pos0 to Pos7 is fed to the memory device 44 and the input values $x_{in1}$, $x_{in2}$ which are assigned to the result value f are stored in the memory device 44, in which case they may for example likewise—as in the example in accordance with FIG. 2—be buffer-stored in a prestorage buffer 41 and are fed to the memory device 44 from the prestorage buffer 41.

The stored input values are two-valued vectors A0 to A7. These stored vectors are fed to an accumulator 51, in which an error vector $V_{err}$ is calculated. The error vector $V_{err}$ is in turn fed to a filter 52 and is converted by the latter to a correction value vector Vu having the vector components $u_1$ and $u_2$. In this case, a new correction value vector Vu is converted e.g. whenever a present result value f matches one of the reference values. In such a case, a control signal CLOCK is respectively fed to the filter 42.

The control apparatus may be realized for example both as hardwired logic and in a microcontroller in the form of a program. The implementation of the (digital) control is simple since only addition and shift operations are required.

With the control apparatus, a complete offset compensation can be achieved in the normal operating mode. This does not require any calibration cycles, in particular, since an offset drift is compensated for without a high-pass filter having to be used.

The scope of protection is not restricted to the exemplary embodiments.

What is claimed is:

1. A control apparatus configured to generate correction values for compensation of disturbance signals of a sensor, comprising:
   a control loop having an input to receive input values, the control loop comprising:
   circuitry configured to receive the input values, the circuitry being configured to produce output values based on the input values;
   an evaluation device downstream from the circuitry relative to the input, the evaluation device being configured to receive the output values and to convert the output values into result values; and
   a correction device configured to receive the result values and the input values and to generate correction values based on the result values and the input values, the correction device being configured to provide the correction values to the circuitry;
   wherein the correction device comprises a detection device comprising memory, the detection device for storing the input values in the memory based on the result values.

2. The control apparatus of claim 1, wherein the detection device comprises a reference memory to store reference values and a comparator to compare the result values to reference values from the reference memory.

3. The control apparatus of claim 1, wherein the detection device comprises a buffer to store the input values temporarily, the input values so stored comprising stored input values.

4. The control apparatus of claim 3, wherein the correction device comprises a correction value generator to generate correction values based on the stored input values.

5. The control apparatus of claim 4, wherein the correction value generator comprises an accumulator to generate a weighted sum of the stored input values.

6. The control apparatus of claim 5, wherein the correction value generator comprises a filter to receive output values from the accumulator and to produce the correction values based on the output values from the accumulator.

7. The control apparatus of claim 1, wherein the sensor comprises a magnetic field sensor and the evaluation device is configured to output an angle as at least one of the result values.

8. The control apparatus of claim 1, wherein the input values correspond to sensor signals that are affected by disturbance signals.

9. The control apparatus of claim 1, wherein the circuitry is configured to produce the output values based on the input values and based on the correction values.

10. The control apparatus of claim 9, wherein the circuitry is configured to subtract correction values from input values to produce the output values.

11. The control apparatus of claim 1, wherein the correction device comprises circuitry to:
compare a result value to at least one pair of reference values;
if the result value corresponds to one of the reference values, store input values that correspond to the result value; and
after input values have been stored for at least one pair of reference values, generate the correction values based on comparison of an expected relationship of stored input values to an actual relationship of the stored input values.

12. A sensor comprising:
a control apparatus configured to generate correction values for compensation of disturbance signals of the sensor, the control apparatus comprising:
a control loop having an input to receive input values, the input values corresponding to signals sensed by the sensor, the control loop comprising:
circuitry configured to receive the input values, the circuitry being configured to produce output values based on the input values;
an evaluation device downstream from the circuitry relative to the input, the evaluation device being configured to receive the output values and to convert the output values into result values; and
a correction device configured to receive the result values and the input values and to generate correction values based on the result values and the input values, the correction device being configured to provide the correction values to the circuitry;
wherein the correction device comprises a detection device comprising memory, the detection device for storing the input values in the memory based on the result values.

13. The sensor of claim 12, wherein the detection device comprises a reference memory to store reference values and a comparator to compare the result values to reference values from the reference memory.

14. The sensor of claim 12, wherein the detection device comprises a buffer to store the input values temporarily, the input values so stored comprising stored input values.

15. The sensor of claim 14, wherein the correction device comprises a correction value generator to generate correction values based on the stored input values.

16. The sensor of claim 15, wherein the correction value generator comprises an accumulator to generate a weighted sum of the stored input values.

17. The sensor of claim 16, wherein the correction value generator comprises a filter to receive output values from the accumulator and to produce the correction values based on the output values from the accumulator.

18. The sensor of claim 12, wherein the sensor comprises a magnetic field sensor and the evaluation device is configured to output an angle as at least one of the result values.

19. The sensor of claim 12, wherein the sensor is a Hall sensor used for measurement of angles.

20. The sensor of claim 12, wherein the correction device comprises circuitry to:
compare a result value to at least one pair of reference values;
if the result value corresponds to one of the reference values, store input values that correspond to the result value; and
after input values have been stored for at least one pair of reference values, generate the correction values based on comparison of an expected relationship of stored input values to an actual relationship of the stored input values.

* * * * *